United States Patent [19]
Clark et al.

[11] Patent Number: 5,823,808
[45] Date of Patent: Oct. 20, 1998

[54] CAM LEVER OPERATED CONNECTOR

[75] Inventors: Dean B. Clark, Clawson; Kenneth Hartwig, Ortonville; Larry L. Neblett, Pinckney; Thomas E. Zielinski, China; David B. Hansen, Grand Rapids, all of Mich.

[73] Assignee: Chrysler Corporation, Auburn Hills, Mich.

[21] Appl. No.: 699,837

[22] Filed: Aug. 20, 1996

[51] Int. Cl.⁶ ................................................ H01R 13/62
[52] U.S. Cl. ................................................ 439/157
[58] Field of Search .................................. 439/157, 153, 439/155, 159, 310, 372, 271, 283, 160

[56] References Cited

U.S. PATENT DOCUMENTS

| | | | |
|---|---|---|---|
| 2,710,949 | 6/1955 | Happe et al. | 339/258 |
| 2,872,656 | 2/1959 | Phelps | 339/192 |
| 3,101,229 | 8/1963 | Yopp | 339/59 |
| 3,680,033 | 7/1972 | Kawai | 439/180 |
| 3,750,084 | 7/1973 | Gardner | 339/61 R |
| 3,888,559 | 6/1975 | Geib | 339/46 |
| 3,889,129 | 6/1975 | Menzel et al. | 307/105 |
| 4,109,992 | 8/1978 | Hughes et al. | 339/147 R |
| 4,168,877 | 9/1979 | Little et al. | 339/103 M |
| 4,387,944 | 6/1983 | Frear | 339/59 R |
| 4,422,706 | 12/1983 | Neuhouser | 339/107 |
| 4,440,464 | 4/1984 | Spinner | 339/33 |
| 4,448,474 | 5/1984 | Melnychenko | 339/103 M |
| 4,582,378 | 4/1986 | Fruchard | 339/45 M |
| 4,658,212 | 4/1987 | Ozawa et al. | 324/158 |
| 4,715,827 | 12/1987 | Furman | 439/465 |
| 4,726,786 | 2/1988 | Hill | 439/504 |
| 4,810,208 | 3/1989 | Hayes et al. | 439/589 |
| 5,246,379 | 9/1993 | Wright | 439/321 |
| 5,263,871 | 11/1993 | Sano et al. | 439/157 |
| 5,269,696 | 12/1993 | Okada et al. | 439/157 |
| 5,288,242 | 2/1994 | Muzslay | 439/349 |
| 5,335,272 | 8/1994 | Lofmark et al. | 379/413 |
| 5,344,347 | 9/1994 | Inoue et al. | 439/701 |
| 5,454,728 | 10/1995 | Jack | 439/277 |
| 5,455,515 | 10/1995 | Saijo et al. | 324/538 |
| 5,486,115 | 1/1996 | Northey et al. | 439/108 |
| 5,503,569 | 4/1996 | Huss, Jr. et al. | 439/595 |
| 5,511,987 | 4/1996 | Shinchi | 439/271 |
| 5,513,997 | 5/1996 | Taguchi et al. | 439/157 |
| 5,538,436 | 7/1996 | Garney | 439/270 |
| 5,597,315 | 1/1997 | Taguchi | 439/157 |
| 5,611,703 | 3/1997 | Okamoto et al. | 439/157 |

FOREIGN PATENT DOCUMENTS

226593  3/1958  Australia .

*Primary Examiner*—Gary F. Paumen
*Assistant Examiner*—Tho D. Ta
*Attorney, Agent, or Firm*—Thomas G. Pasternak

[57] ABSTRACT

An electrical connector comprising a male member, a female member, a cam lever for engaging the male and female members, and a lock portion including a sliding member slidable on a track and engaging the cam lever for holding said cam lever in a closed position.

6 Claims, 11 Drawing Sheets

CAM LEVER OPERATED CONNECTOR

BACKGROUND OF THE INVENTION

1. Field of the Invention

The present invention relates to improved features for use in electrical connectors used in high current applications in electric machines such as electric vehicles.

2. Description of the Related Art

With the proliferation and increased emphasis on the development of electrically-powered vehicles, the need for improved high current electrical connectors exists. Connectors used in the automotive field and elsewhere, and particularly in electric vehicles, must be capable of withstanding heavy current loads. In electric vehicles, connectors are used to connect the battery pack of the electric vehicle to high voltage distribution boxes and to connect the high voltage distribution boxes to the charging port and to the motor of the vehicle.

The environment in which these connectors are used puts a great deal of both mechanical and thermal stress on them. The mating members of these connectors thus must be securely connected so that the connector does not fail during normal usage. Additionally, the connectors must be relatively easy to mate, that is, one member of the connector be readily insertable into its mating member. It also is desirous that the connector be easily adapted to a variety of orientations. The connector also must be easily sealed at the point of connection of the wire assembly to the connector. The connector must be heavy duty to withstand high current loads and must provide secure electrical contact. It further is desired that connector take up less space, provide for flexibility in application, and that it provide for a safe means of connection and disconnection.

Additionally, unlike a typical automotive application where the vehicle chassis provides the return path, in an electric vehicle the high voltage negative component must be isolated from the vehicle chassis, and it is desirous to have both positive and negative voltage in the same connector body for space considerations. It also is desirous that a control circuit line be contained within the same connector body for space considerations.

SUMMARY OF THE INVENTION

Accordingly, it is an object of the present invention to provide a connector capable of withstanding heavy current loads. It is a further object of the present invention to provide a connector that takes up less space. It is another object of the present invention to provide a connector capable of withstanding mechanical and thermal stress. It is a further object of the present invention to provide a connector that is easily mated and firmly secured. It is still a further object of the present invention to provide a connector which can be safely connected and disconnected, and that the control circuit that provides this function be contained in the same connector body as the power circuit. It is yet another object of the present invention to provide a connector wherein the positive and negative voltage connections are contained in the same connector body.

Other features of the present invention are disclosed and claimed in the following copending patent applications, which are hereby incorporated by reference:

1) Ser. No. 08/699,835, titled Dual Power Connector;
2) Ser. No. 08/699,836, titled Rotatable Pin Connector;
3) Ser. No. 08/699,837, titled Dual Power/Control Connector; and
4) Ser. No. 08/699,838, titled Split Seal Retainer For an Electrical Connector.

Therefore, disclosed and claimed herein is an improved electrical connector for high current uses in vehicles and machines, and particularly applicable for use in electric vehicles.

The connector includes a female connector member and a male connector member for sliding insertion into the female connector member. The female connector member in turn is connected to a wire assembly via positive and negative crimped sockets, the male connector member, to bus bars.

The male connector member in turn further comprises a pin connector body, pin connector cavities defined by the connector body, and positive pin and negative pins, rotatably mounted within their respective cavities. The pins further comprise bus tabs for connection to bus work.

The female connector member further comprises a female connector member body, a positive socket and a negative socket for receiving a wire assembly, the positive and negative sockets defined by the connector body, positive and negative pin receptacles connected to the sockets and contained within a female connector member cavity defined by the connector body, the wire assembly contained within the sockets for electrical contact with the pins of the male connector member in the receptacles, cam lever means connected to the connector body to allow connection and disconnection of the two members, and locking means to lock the cam lever means in place.

The connector further comprises a seal retainer, the seal further comprising two identical halves, with a locking tab at one end and a tab receptacle at the other end, the seal being secured by connecting corresponding locking tabs and tab receptacles from opposite sides of the conductor.

The connector further comprises a control circuit comprising positive and negative control lines within the same connector body as the power circuit but offset from the power connections to provide for safe connection and disconnection of the connector. This arrangement assures that the control circuit is fully connected before the power circuit can be energized and fully disconnected before the power circuit is deenergized. It is last to make and first to break and must be connected to allow the power circuit to be energized.

These and other objects of the present invention are described in greater detail in the detailed description of the invention, the appended drawings and the attached claims.

DETAILED DESCRIPTION OF THE INVENTION

Figure 1:
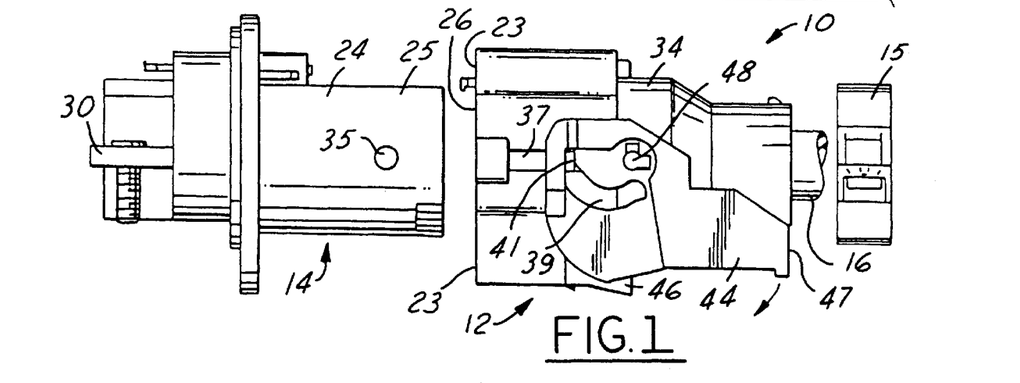
FIG. 1 is an exploded side view of the power connector of the present invention.
Figure 2:
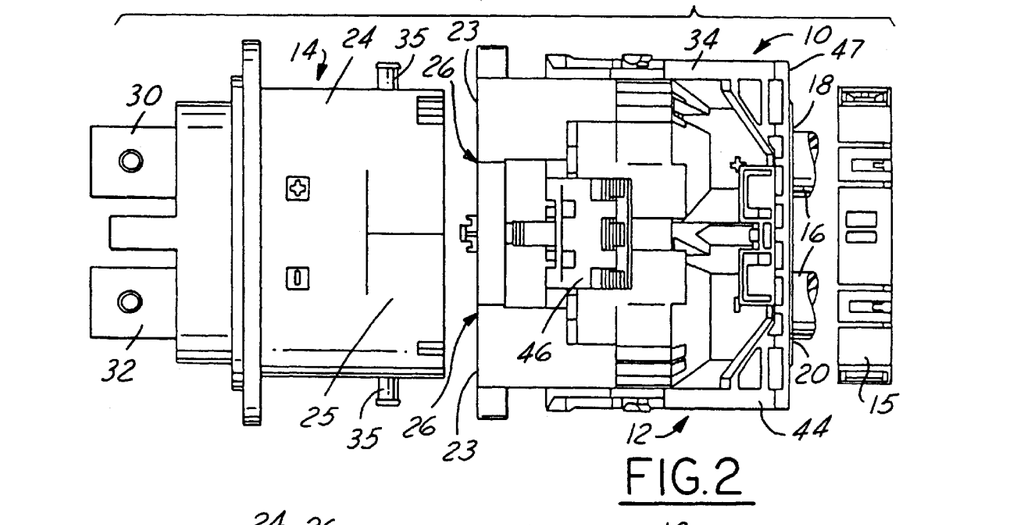
FIG. 2 is an exploded top view of the power connector of the present invention.
Figure 3:
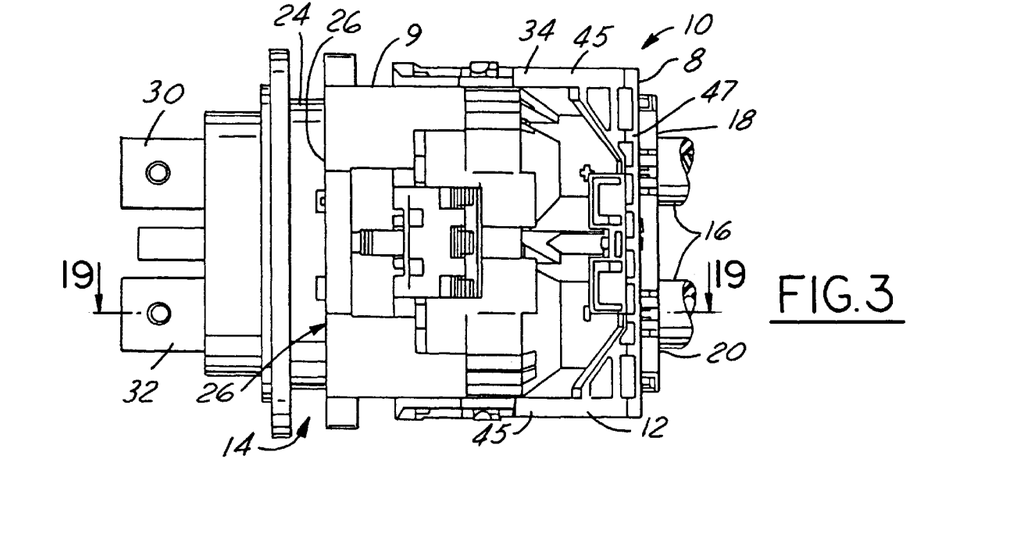
FIG. 3 is a top view of the power connector of the present invention partially connected.

Turning to FIGS. 1–3, power connector 10 of the present invention is shown. Power connector 10 further comprises three major subassemblies, female connector member 12, male connector member 14, and seal retainer 15, which will be described in detail. A wire assembly 16 is connected to female connector member 12, which in turn is connected to male connector member 14 via slidable insertion to establish electrical contact between the wire assembly and bus work or other desired points of connection (not shown). In the preferred embodiment the wire assembly comprises both a positive and negative high voltage lead connected to the same connector body. However, the features of the present invention may also be used with a wire assembly constituting only the positive or only the negative lead.

Female connector member 12 in the preferred embodiment further comprises cam lever means 44 and locking means 46, but other features of the present invention may be used without the cam lever means or the locking means. Wire assembly 16, which in use with the preferred embodiment of the present invention comprises a positive and negative power lead, enters positive socket 18 and negative socket 20 of female connector member 12. As previously discussed, unlike typical automotive applications, where the vehicle chassis provides the return path or ground, in an electric vehicle the high voltage return path needs to be isolated from the vehicle chassis. Accordingly, the present invention in the preferred embodiment places both power leads in the same connector body. Positive socket 18 and negative socket 20 connect through to pin receptacles 26 of second side 9 of the female connector member body, which in turn receive the positive and negative pins of the male connector member 14.

To assemble power connector 10, male connector member 14, which further comprises pin connector body 24 defining pin connector cavities 25 which pass through the pin connector body and which house the positive and negative pins, is initially slidably inserted into female connector member cavity 23 of female connector member body 34. Engagement pins 35 on the outside of either side of pin connector cavities 25 engage slots 37 on either side of female connector member 12, and in turn engage arcuate slots 39 of cam lever means 44, first abutting shoulder 41. Cam lever means 44 must be moved downward (as indicated by the arrow in FIG. 1) to allow further movement of male connector member 14 into female connector member 12.

Figure 4:
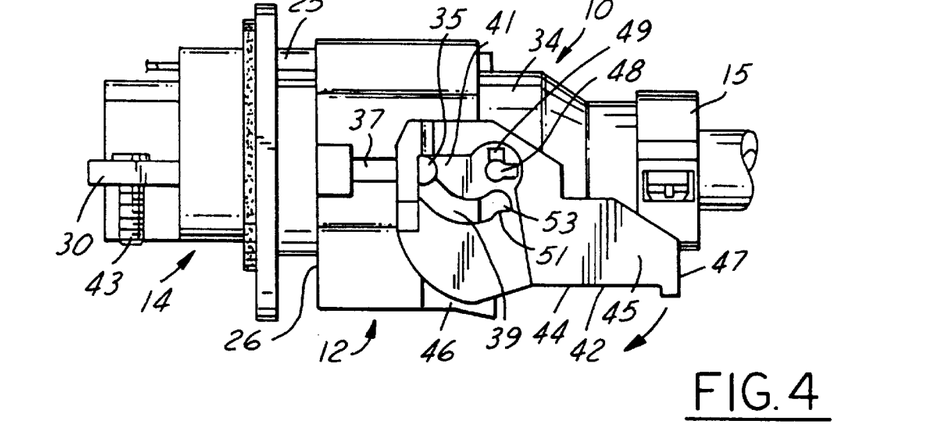
FIG. 4 is a side view of the power connector of the present invention at initial connection.
Figure 5:
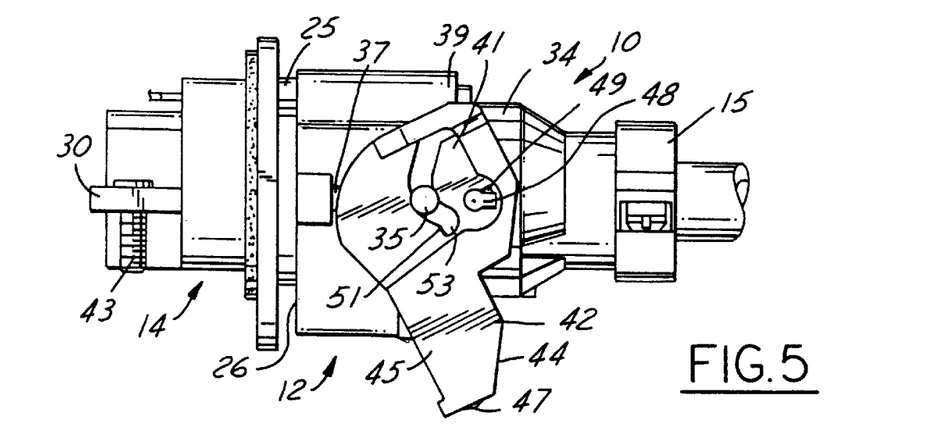
FIG. 5 is a side view of the power connector of the present invention partially connected.
Figure 6:
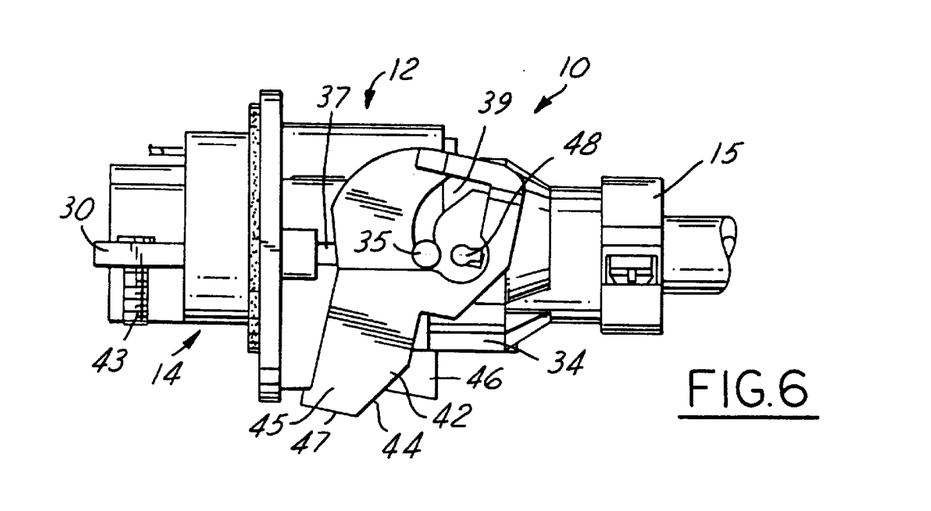
FIG. 6 is a side view of the power connector of the present invention fully connected.

This connection of the male connector member to the female connector member is readily seen with references to FIG. 4, FIG. 5 and FIG. 6, which show the power connector in three stages of assembly.

Turning first to FIG. 4, male connector member 14 is shown initially inserted into female connector member 12. Pin connector cavity 25 is inserted into female connector member cavity 23. The fit between the two is tight but loose enough to allow sliding contact. Engagement pins 35 engage slots 37 of connector body 34 of female connector member 12. Upon initial insertion of male connector member 14 into female connector member 12, pins 35 engage slots 37. Pin connector 14 then is slid into female connector member 12 until engagement pins 35 abut first shoulders 41, preventing further insertion (FIG. 4). Again, the fit between engagement pin and the slots is sufficiently tight to allow a sliding fit. Cam lever means 44 is at this point in a substantially horizontal or open position.

Cam lever means 44 in the preferred embodiment comprises cam lever 42, comprising two substantially parallel legs 45 connected by handle 47 to form a generally U-shaped member. Legs 45 further each define arcuate slots 39 which each terminate in a shoulder 41. Cam lever means 44 may comprise any other suitable structure that allows it to perform its function, which in the preferred embodiment controls connection and disconnection of the power connector. The cam lever means must be operated to do either. Cam lever means 44 is connected to female connector member 12 via mounting pins 48 which are engaged with and rotate within openings 49 defined by legs 45.

Turning to FIG. 5, which shows intermediate insertion, as cam lever means 44 is rotated downward, engagement pins 35 pass along first shoulders 41 into arcuate slots 39. As the cam lever means is further rotated downward, further insertion is effectuated. The cam lever means rotates about the engagement pins, allowing pins 35 to travel further along slots 37, forcing male connector member 14 into female connector member 12. Continued rotation of cam lever means 44 causes nearly full insertion of male connector member 14 into female connector member 12, at which point pins 35 pass over second shoulders 51 of arcuate slots 39 into grooves 53 at the end of the slots. To move past shoulders 51 a slight increase in effort in rotating the cam lever is required to force pins 35 over shoulders 51 and into grooves 53. At this point the power connection is fully mechanically connected, as shown in FIG. 6. Cam lever means 44 is in the horizontal, or closed position. The cam lever means not only assures connection when locked in place but lowers insertion forces during mating. In the preferred embodiment it is easily replaced via one piece manufacture and simple external connection. The cam lever means provides positive connection and disconnection of the component parts.

Turning to FIG. 7–FIG. 12A, the male connector member 14 of the power connector 10 of the present invention is shown in detail. Male connector member 14 comprises connector body 24 which defines pin connector cavities 25 which in the preferred embodiment are cylindrical cavities passing axially parallel through the connector body. Another embodiment of the present invention may comprise a single cavity, for example in the case where only a positive or negative power lead is carried within the same connector body. As previously discussed, unlike typical automotive applications, where the vehicle chassis provides the return path or ground, in an electric vehicle the high voltage return path needs to be isolated for the vehicle chassis. Accordingly, the present invention in the preferred embodiment places both power leads in the same connector body. The cavities receive negative pin 29 and positive pin 27. The pins in the preferred embodiment are rotatably mounted with their respective cavities via pin collars 22 to allow rotation to various attitudes, allowing flexibility in application. This rotatable pin aspect of the present invention may be used in a variety of ways in various connector applications. The pins further comprise pin ends 17 and 19 and bus tabs 30 and 32. The bus tabs further comprise posts 43 for connection of the tabs to bus work. Pins 17 and 19 engage in connector body 24 via deflectable fingers 31 which engage shoulders 22 of pins 17 and 19 inside the connector body. Wedges 33 hold the pins in the fingers via their pin collars, and apply pressure to the deflectable fingers such that they engage the pin collars. The pins may rotate freely thereabout, to allow various orientations of the bus tabs for connection of the pin connector side. Connector body 24 further comprises outer flange 60 which defines flange holes 62 for connection of the connector to any desired location. Membrane seal 64 fits around inner flange 66.

Figure 7:
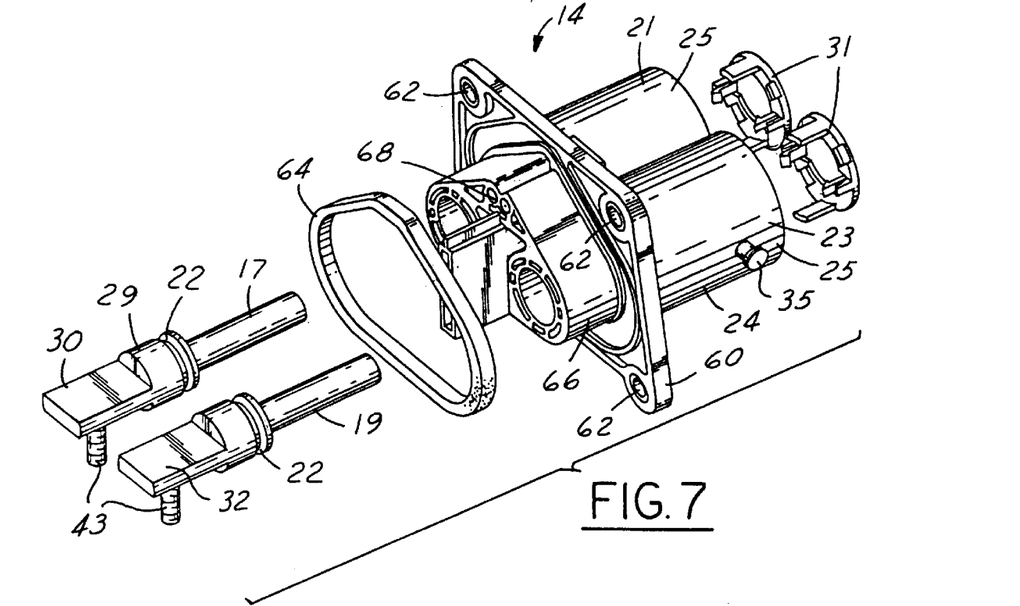
FIG. 7 is an exploded perspective view of the male connector member of the present invention.
Figure 8:
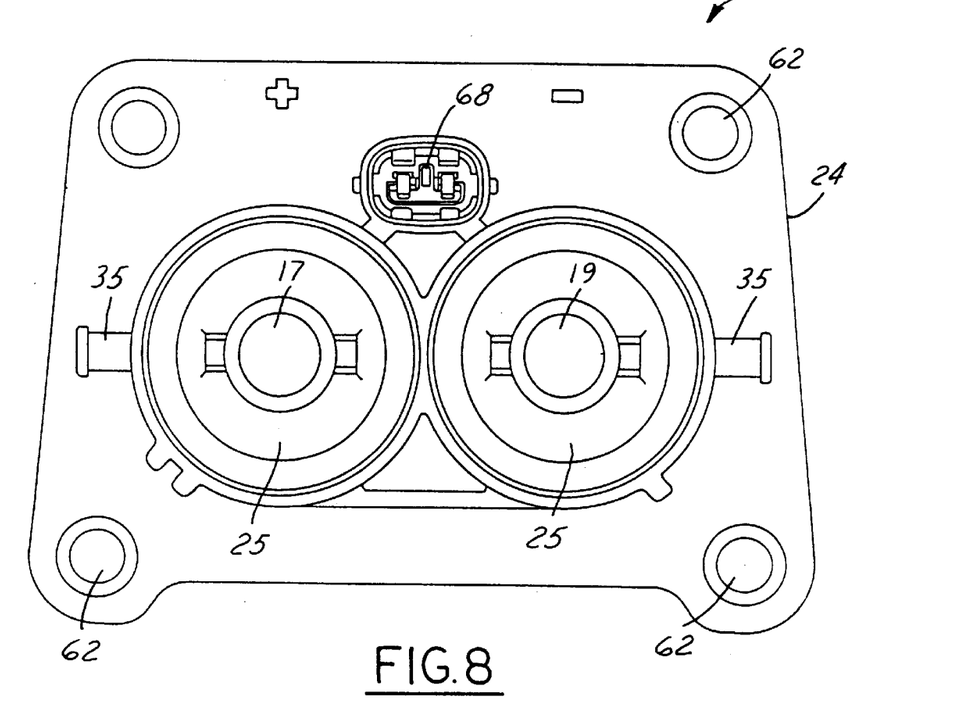
FIG. 8 is a front view of the male connector member of the present invention.
Figure 9:
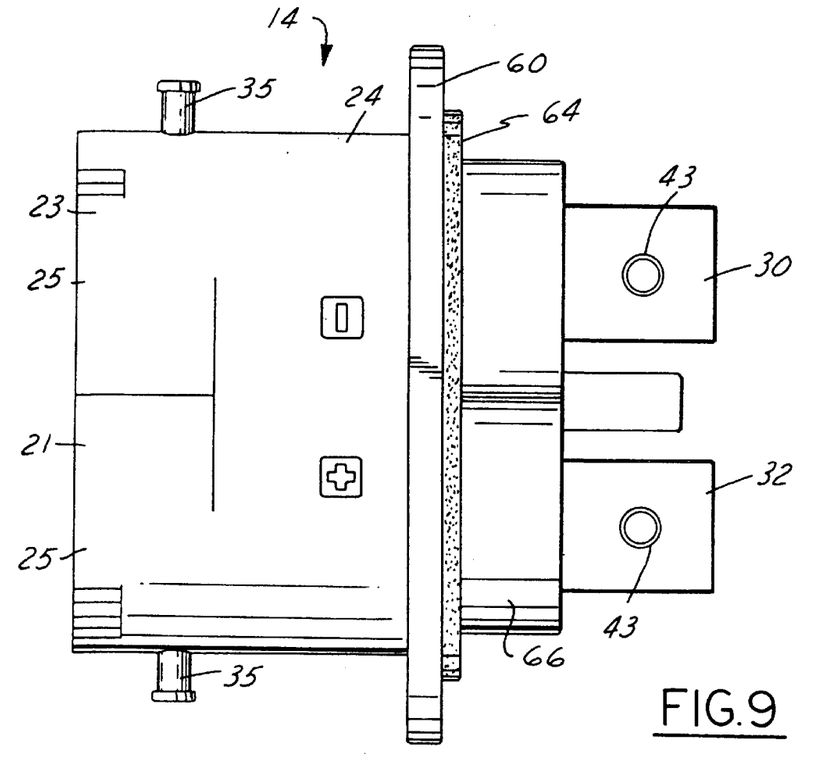
FIG. 9 is a top view of the male connector member of the present invention.
Figure 10:
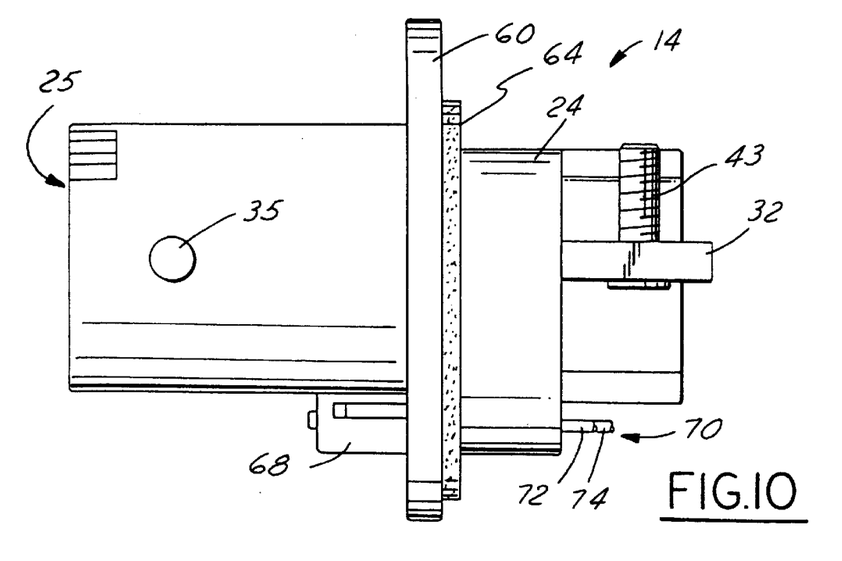
FIG. 10 is a side view of the male connector member of the present invention.
Figure 11:
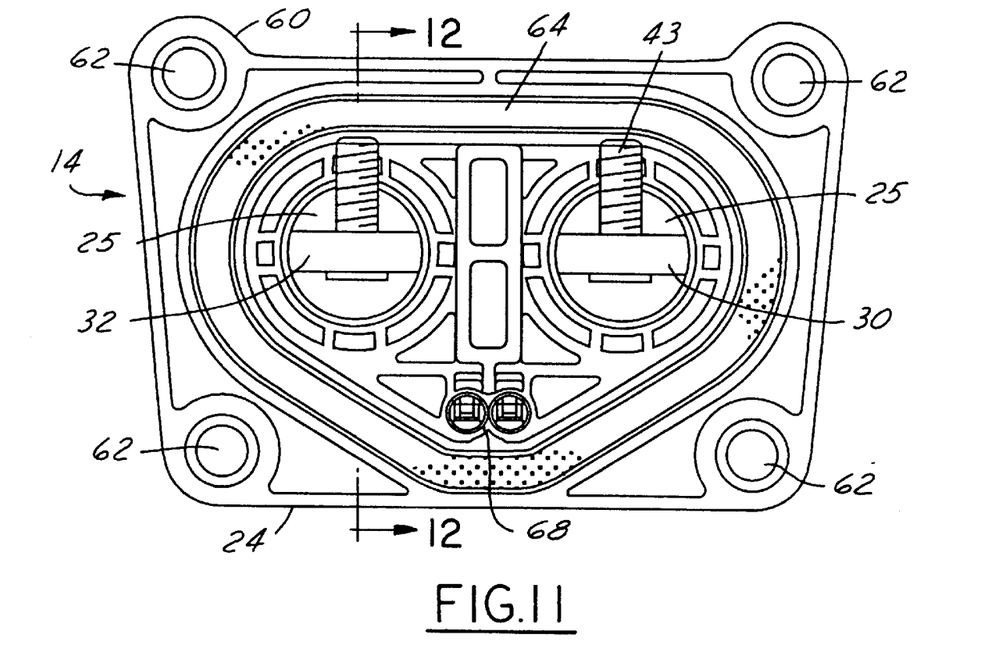
FIG. 11 is a back view of the male connector of the present invention.

Male connector member 14 further in the preferred embodiment comprises male control circuit recess 68 through which passes control circuit 70 which further comprises control leads 72 and 74, one of which is positive, and one of which is negative. As can be seen, the present invention, unlike conventional connectors, in the preferred embodiment places the control circuit and the power circuit in the same body, saving space and assuring safety. It need not be seen so in every embodiment of the present invention, and the other features of the present invention may be used without the control circuit.

Figure 12:
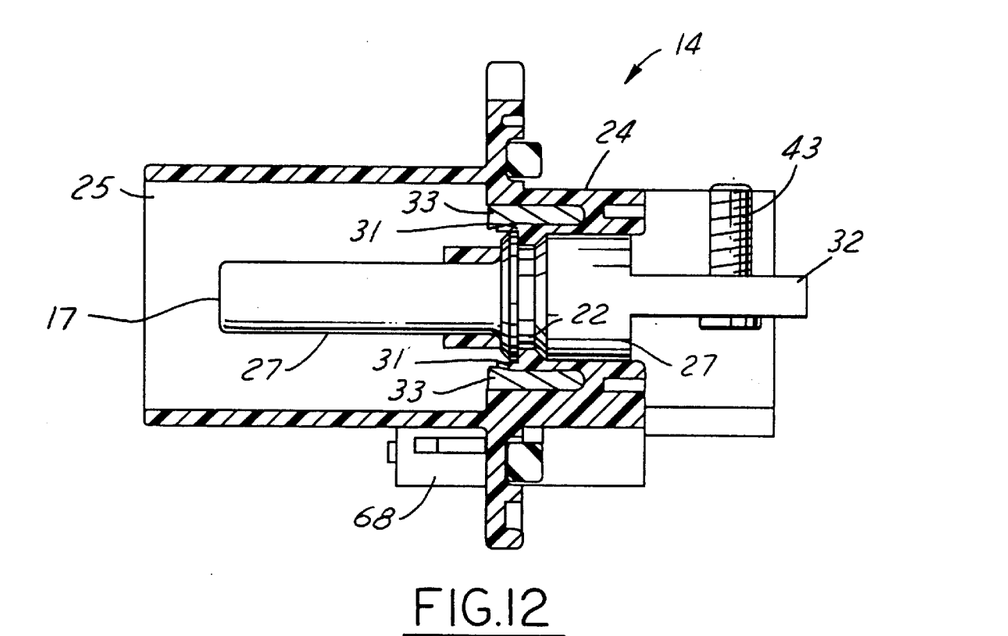
FIG. 12 is a section view of the male connector member of the present invention taken along line 12—12 of FIG. 11.
Figure 12A:
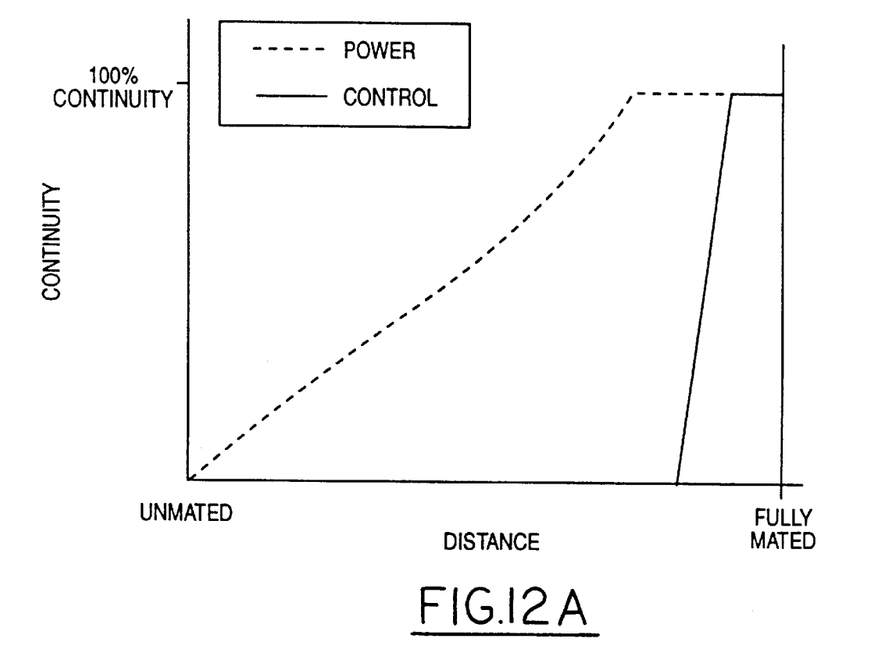
FIG. 12A is graph of the mating characteristics of the present invention.

The power circuit connection and control circuit connection moreover are preferably physically offset so that electrical connection or disconnection of the power supply is made only after the power circuit is fully mechanically connected or disconnected. If mechanical connection of the power circuit is made or broken while the circuit is live, that is, connected to the main power supply, arcing will occur across the connector which may cause unacceptable heating and erosion at the points of electrical contact. As can be appreciated, since the male and female connectors are electrically dead during making and breaking of their electrical connection, arcing is prevented. The control circuit thus serves to ensure that the power supply is switched on only while the power connections are in full physical contact. Because of the physical offset, the power circuit must be fully physically connected before the control circuit can be energized to in turn cause the power circuit to be energized. Similarly, the control circuit thus serves to ensure that the power circuit is deenergized before it can be physically disconnected. The control circuitry may comprise any conventional control strategy, and typically is part of a larger circuit that weaves in and out of various devices and wire harnesses containing high voltage circuits. The mating sequence of the circuit is shown in FIG. 12A, which show electrical continuity versus power and control circuit connector separation.

Turning to FIG. 13–FIG. 18, the details of the female connector member of the power connector of the present invention are shown. Wire assembly 16, which in the preferred embodiment comprises both a positive and negative power lead (unlike conventional high voltage connectors in which positive and negative power leads are contained in different connector bodies), enter positive and negative sockets 18 and 20 of connector body 34. In a single lead connector there will only be one socket. As previously discussed, unlike typical automotive applications, where the vehicle chassis provides the return path or ground, in an electric vehicle the high voltage negative path needs to be isolated from the vehicle chassis. Accordingly, the present invention puts both leads in the same connector body. The wire assembly is conventionally crimped to the sockets. Seal retainer 15 is snapped in place over the wire assembly and around the connector body end 34 to seal the connector. Wire seals 76 surround the wire assembly 16, which passes through sockets 18 and 20. Pin receptacles 26 of cavities 25 receive the pins and connect to the sockets containing the wire assembly, which is secured in place in the socket by conventional crimping means.

Figure 13:
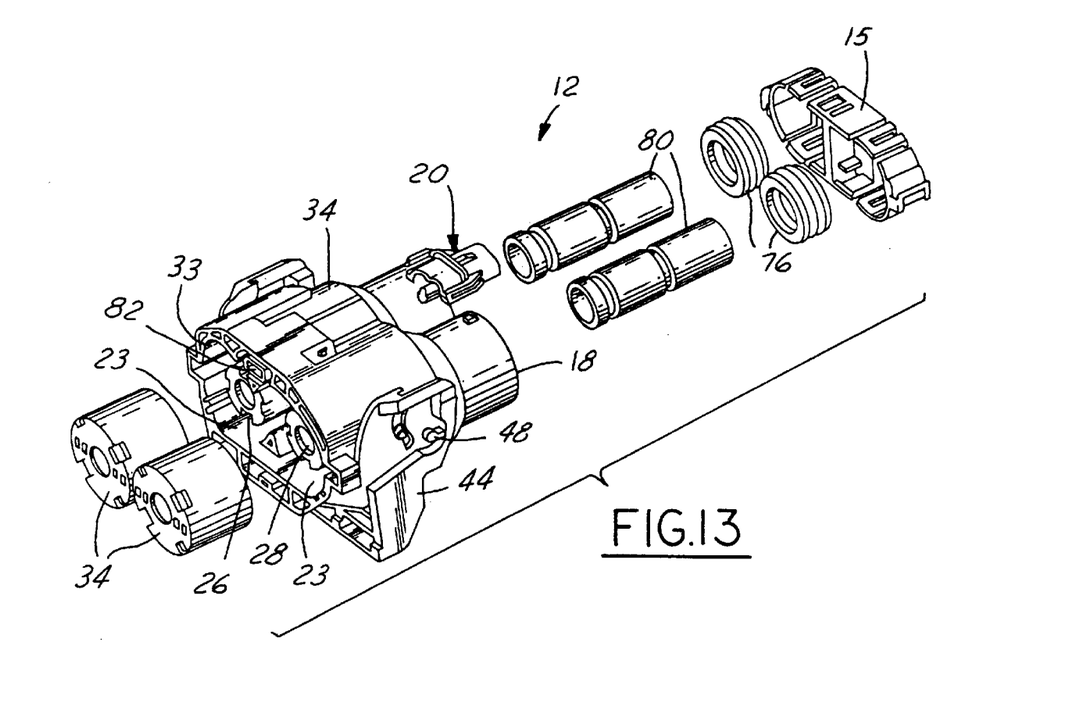
FIG. 13 is an exploded perspective view of the female connector member of the present invention.
Figure 14:
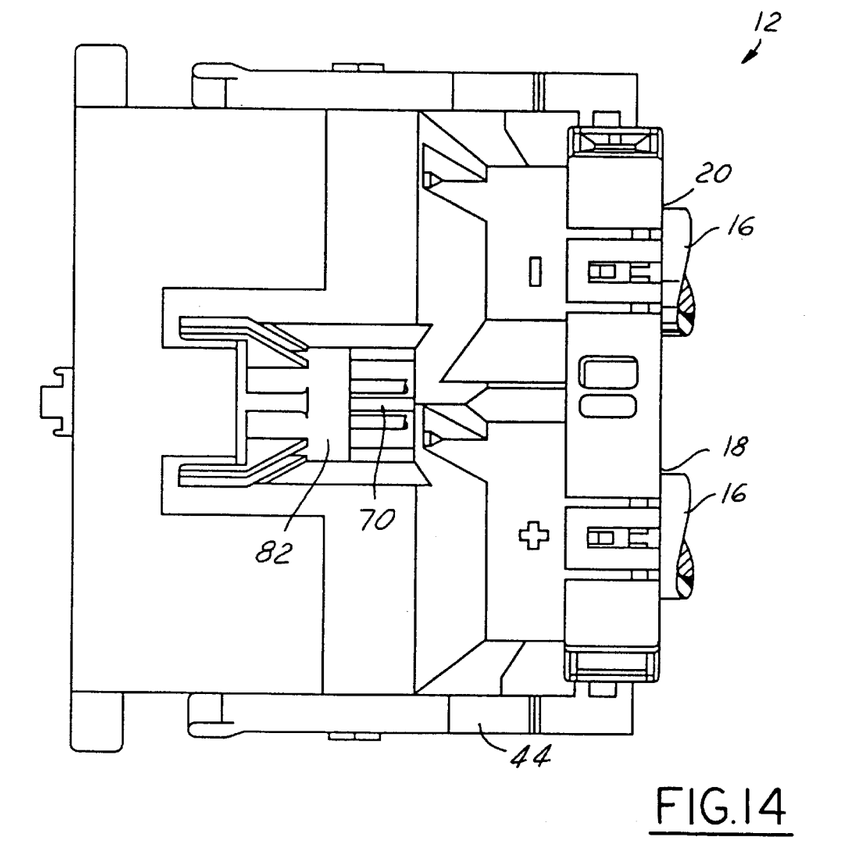
FIG. 14 is a bottom view of the female connector member of the present invention.
Figure 15:
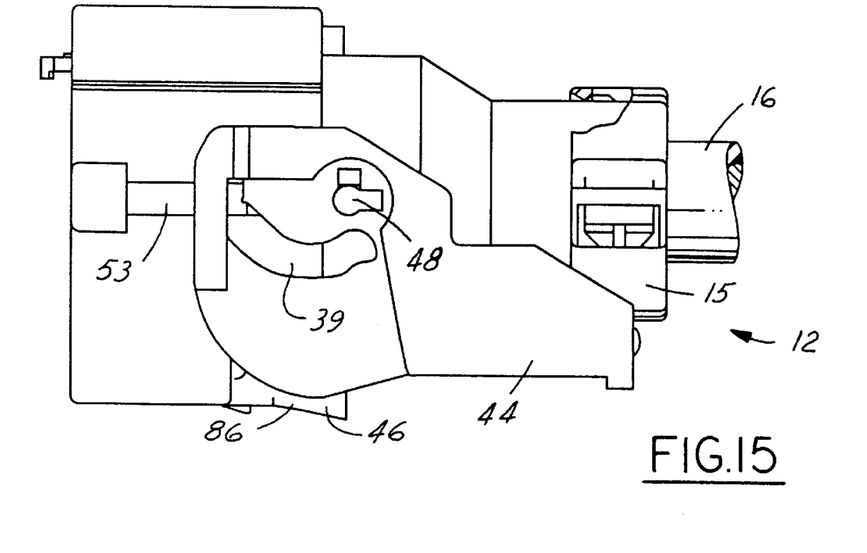
FIG. 15 is a side view of the female connector member of the present invention.
Figure 16:
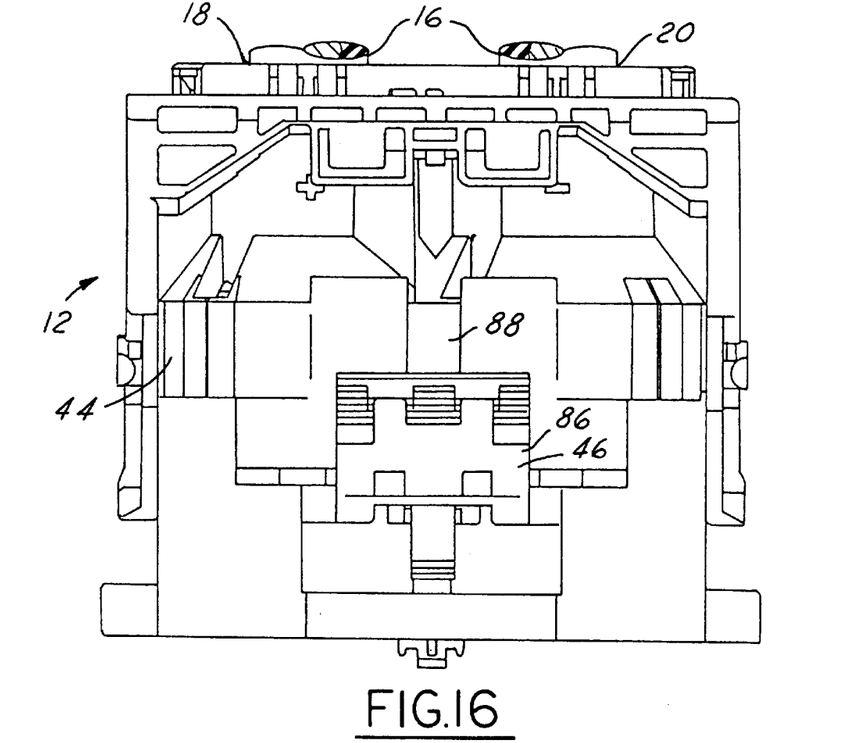
FIG. 16 is a top view of the female connector member of the present invention.
Figure 17:
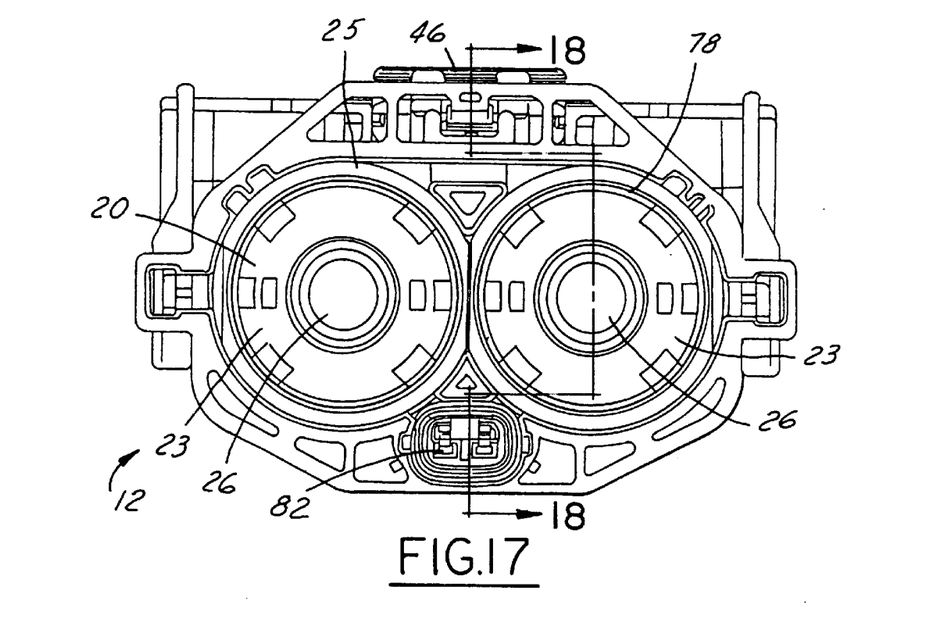
FIG. 17 is a front view of the female connector member of the present invention.

The pin ends contact the wire ends physically, allowing electrical connection. The receptacle member in the preferred embodiment further comprises female control circuit recess 82 for passage of control circuit 70. Again, this feature need not be present and the other features of the present invention can be used without the control circuit. When the power connector is fully connected, pin control circuit recess is received within receptacle control circuit recess, allowing connection of the control circuit. Insulators 84 fit into cavity 25 around pin receptacles 26.

Female connector member 12 further comprises locking means 46 (FIGS. 14 and 16–19) in the preferred embodiment, for holding cam lever means 44 in the fully closed position. In the preferred embodiment, locking means 46 comprises a sliding member which, slidably engages the connector body. The locking means is slid into place to lock the cam lever means, and must be slid back to move the cam lever arm and disconnect the connector. In the preferred embodiment locking means 46 slides on top of ridge 88. Although any suitable structure to perform this function may be used.

Figure 19:
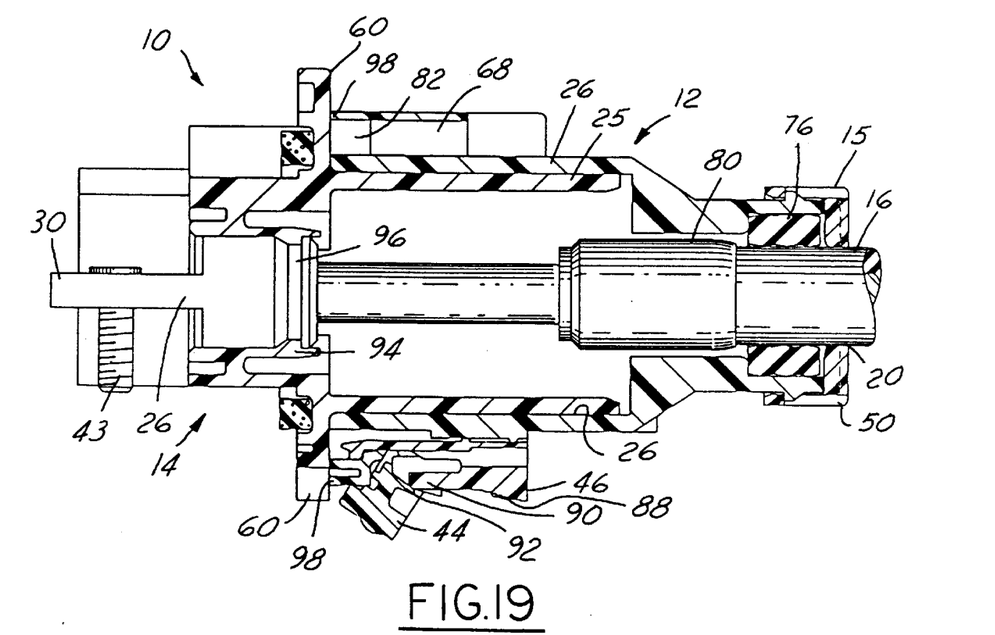
FIG. 19 is a section view of the connected power connector of the present invention along line 19—19 of FIG. 3.
Figure 20:
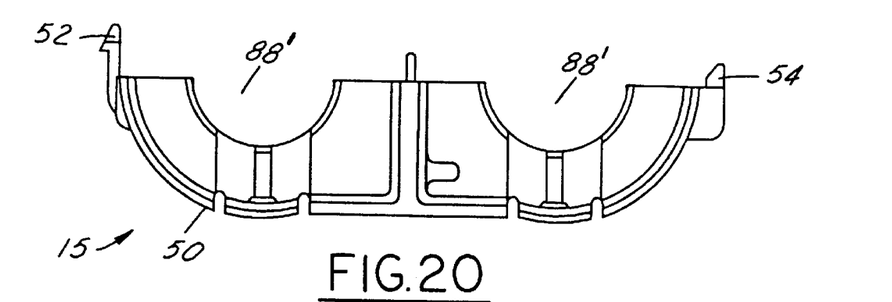
FIG. 20 is a front view of a seal retainer half of the present invention.
Figure 21:
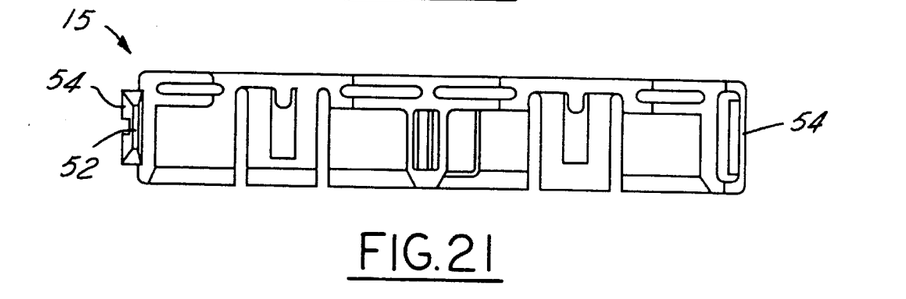
FIG. 21 is a top view of a seal retainer half of the present invention.
Figure 22:
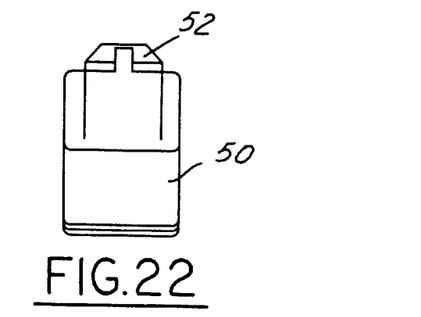
FIG. 22 is a detailed view of the locking tab of the seal retainer of the present invention.
Figure 23:
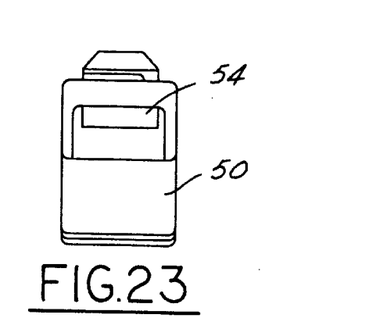
FIG. 23 is a detailed view of the tab receptacle of the present invention.
Figure 24:
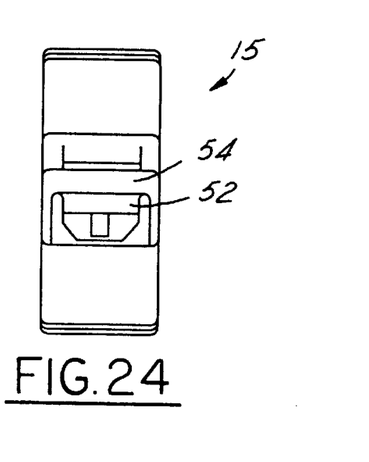
FIG. 24 is a detailed side view of the engagement of the locking tab and tab receptacle of the present invention.
Figure 25:
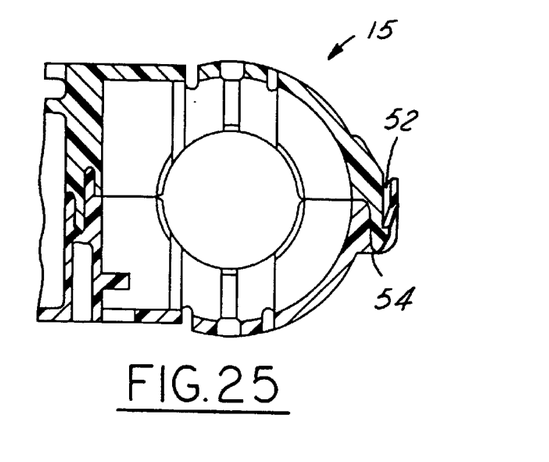
FIG. 25 is a cut away view of the seal retainer of the present invention along line 25 of FIG. 24.

FIG. 19 shows the internal details of the fully connected power connector. As shown, cam lever means 44 is fully forward and locked in place by locking means 46. Locking means 46 must be slid back (see arrow) along ridge 88 to allow movement of cam lever means 44 to allow disconnection of the connector.

The end of wire assembly 16 is held in electrical contact with the pins via the coupling of the female connector member and the male connector member. At full assembly flange 60 abuts edge 98, pin connector enclosure 25 is inserted within pin receptacle 26 so that the male control circuit recess 82 slidably engages with female control circuit recess for engagement of the control circuit. As can be seen, the control circuit connector is offset from the power circuit connection.

Figure 18:
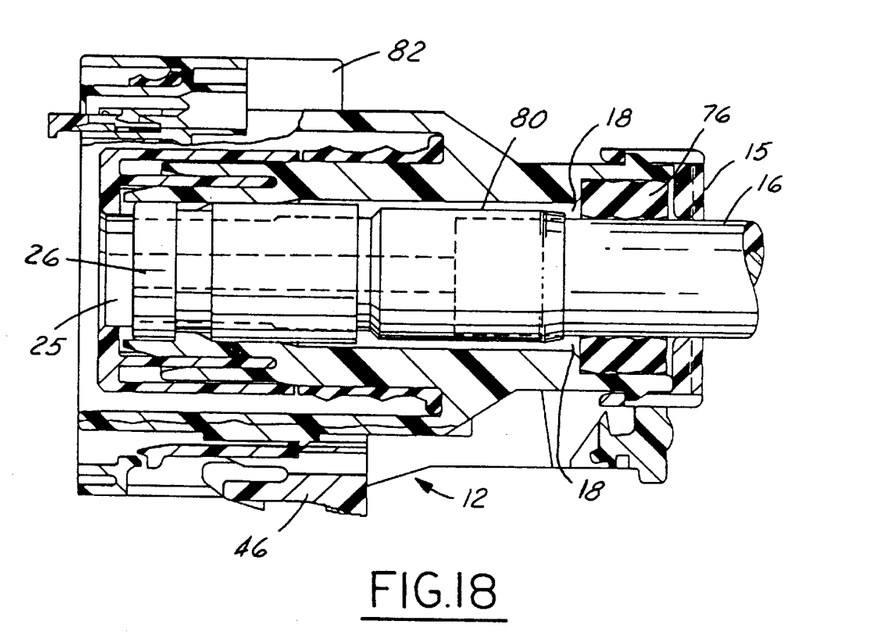
FIG. 18 is a section view of the female connector of the present invention along line 18—18 of FIG. 17.

The details of the seal retainer of the power connector of the present invention are shown in FIG. 20 through FIG. 25. Turning first to FIG. 18, seal retainer half 13 is shown. In the preferred embodiment both seal retainer halves are identical, so only one will be described. Seal retainer half 50 comprises locking tab 52, tab receptacle 54, and wire grooves 88 for engagement with a wire assembly. Seal retainer 15 is assembled at the connector. This assembly is accomplished by putting a seal retainer half around either side of the wire assembly and connector adjacent locking tabs and the receptacle. This split seal retainer construction is in contrast to conventional full seals which must placed over the wire assembly with the wire removed from the connector or which must be installed from the opposite end of the wire assembly and passed over the entire wire assembly, both of which are difficult and time consuming processes. The seal retainer of the present invention thus provides for ease of installing and replacement of the seal retainer.

Figure 26:
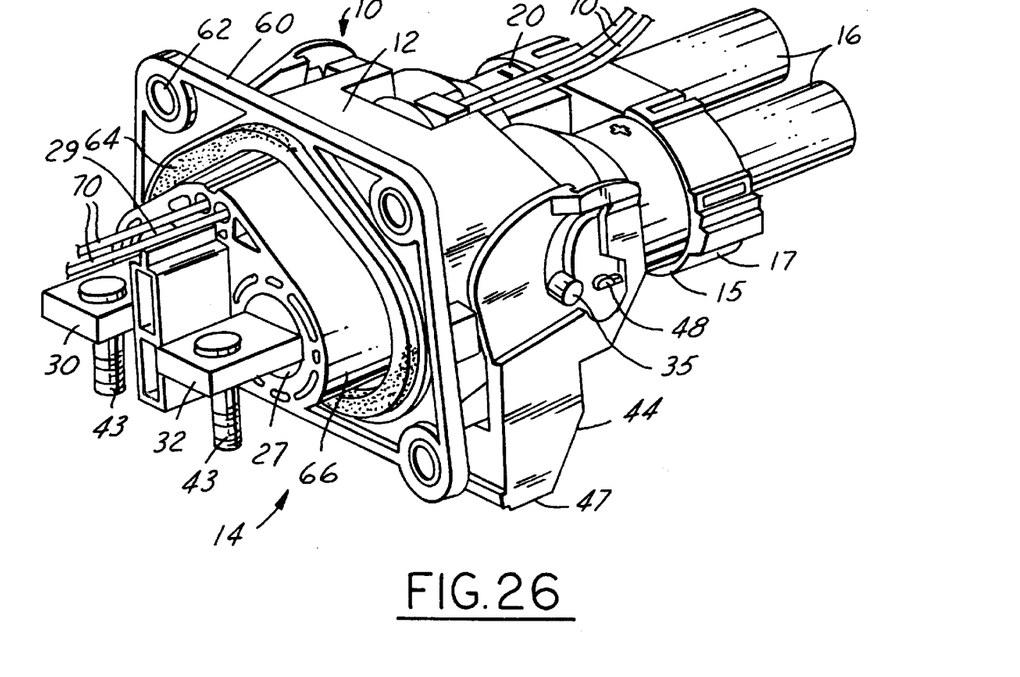
FIG. 26 is a perspective view of the power connector of the present invention.

Turning to FIG. 26, the fully connected power connector of the present invention is shown in perspective view.

Figure 27:
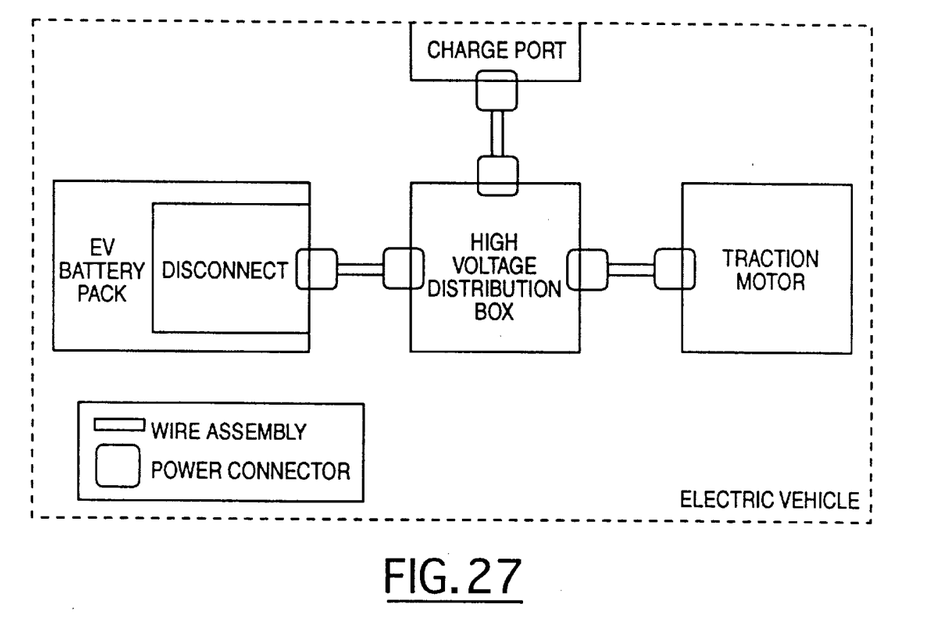
FIG. 27 is a circuit diagram showing locations of the power connector of the present invention in a typical electrical vehicle power distribution circuit.

Turning to FIG. 27, the power connector of the present invention is shown within a typical electrical vehicle circuit. As can be seen, the power connector of the present invention is used to connect the electric vehicle battery pack, the high voltage distribution box, the charge port, and the motor to wire assemblies and thus to each other.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. An electrical connector assembly comprising a male connector member and a female connector member, pivotal cam lever means on one of said male or female connector members for causing said male connector member and said female connector member to engage each other, and locking means on the same one of said male or female connector members for holding said cam lever means in a closed position, said locking means including a sliding member slidable on a track, said sliding member engaging said cam lever means for locking said cam lever means in said closed position.

2. The connector of claim 1 wherein said cam lever means comprises:

a cam lever, said cam lever comprising two substantially parallel legs and a handle, said handle connecting said legs to form a U-shaped member, each said leg defining an arcuate slot with first and second ends further comprising a first shoulder at said first end and a second shoulder at said second end, first and second mounting pins connected to either side of said female connector member for rotatably mounting said cam lever, engagement pins connected to either side of said male member whereby said engagement pins engage said arcuate slots upon insertion of said male member into said female member and whereby said cam lever must be rotated to fully insert said male member into said female member.

3. An electrical connector assembly comprising:

a male connector member;

a female connector member, said female member capable of slidably receiving said male member;

said female connector member further comprising a connector body having first and second sides, a plurality of power sockets for receiving a power source, said power sockets connected to said first side of said body, and a female connector member cavity defined by said second side of said connector body, said connector cavity further comprising a plurality of pin receptacles for receiving said male connector member, said pin receptacles connecting to said power sockets through said body, pivotal cam lever means on said female connector member for causing said male connector member and said female connector member to engage each other, and locking means on said female connector member for holding said cam lever means in place in a closed position, said locking means including a sliding member slidable on a track on said female connector member, said sliding member engaging said cam lever means for locking said cam lever means in said closed position.

4. The connector of claim 3 further comprising cam lever means for connecting and disconnecting said male and female members, said cam lever means further comprising a cam lever, said cam lever comprising two substantially parallel legs and a handle, said handle connecting said legs to form a U-shaped member, each said leg defining an arcuate slot with first and second ends further comprising a first shoulder at said first end and a second shoulder at said second end, first and second mounting pins connected to either side of said female connector member for rotatably mounting said cam lever, engagement pins connected to either side of said male member whereby said engagement pins engage said arcuate slots upon insertion of said males member into said female member and said cam lever must be rotated to fully connect said male member to said female member.

5. An electrical connector assembly comprising:

a male connector member;

a female connector member, said female connector member capable of slidably receiving said male connector member;

said female connector member further comprising a connector body having a first and second side, a plurality of power sockets for receiving a power source, said power sockets connected to said first side of said body, a female cavity defined by said second side of said connector body, said connector cavity further comprising a plurality of pin receptacles for receiving said male connector member, said pin receptacles connecting to said power sockets through said body, cam lever means on said female connector member for connecting and disconnecting said male and female members, said cam lever means comprising a cam lever, said cam lever comprising two substantially parallel legs and a handle, said handle connecting said legs to form a U-shaped member, each said leg defining an arcuate slot with first and second ends further comprising a first shoulder at said first end and a second shoulder at said second end, first and second mounting pins connected to either side of said female connector member for rotatably mounting said cam lever, engagement pins connected to either side of said male connector member whereby said engagement pins engage said arcuate slots upon insertion of said male connector member into said female connector member and said cam lever must be rotated to fully connect said male connector member to said female connector member, locking means on said female connector member for holding said cam lever means in place in a closed position, said locking means including a sliding member slidable on a track on female connector member, said sliding member engaging said cam lever means for locking said cam lever means in said closed position.

6. An electrical connector assembly comprising:

a male connector member;

a female connector member, said female connector member capable of slidably receiving said male connector member;

said female connector member further comprising a connector body having a first and second side, a plurality of power sockets for receiving a power source, said power sockets connected to said first side of said body, a female cavity defined by said second side of said connector body, said connector cavity further comprising a plurality of pin receptacles for receiving said male connector member, said pin receptacles connecting to said power sockets, and a cam lever means on said female connector member positioned for connecting and disconnecting said male and female members;

said cam lever means comprising a cam lever, said cam lever comprising two substantially parallel legs and a handle, said handle connecting said legs to form a U-shaped member, each said leg defining an arcuate slot with first and second ends further comprising a first shoulder at said first end and a second shoulder at said second end, first and second mounting pins connected to either side of said female connector member for rotatably mounting said cam lever, engagement pins connected to either side of said male connector member whereby said engagement pins engage said arcuate slots upon insertion of said male connector member into said female connector member and said cam lever must be rotated to fully connect said male connector member to said female connector member, locking means on said female connector member for holding said cam lever means in place in a closed position, said locking means including a sliding member slidable on a track on said female connector member, said sliding member engaging said cam lever means for locking said cam lever means in said closed position.

\* \* \* \* \*